United States Patent Office 2,910,453
Patented Oct. 27, 1959

2,910,453

LIGHT STABLE HALOETHYLENE POLYMER COMPOSITIONS

David A. Gordon, Midland, Mich., assignor to The Dow Chemical Company, Midland, Mich., a corporation of Delaware No Drawing. Application January 12, 1956
Serial No. 558,611

7 Claims. (Cl. 260—45.85)

This invention relates to new polymeric compositions based on haloethylene polymers. More particularly, it relates to such compositions having unusual stability toward the degradative effects of light.

Haloethylene polymers, such as the polymers and copolymers of vinylidene chloride and vinyl chloride, are known to be highly sensitive to the effects of heat and light. Under prolonged exposure to elevated temperatures and light articles prepared from such polymers become so degraded as to be commercially useless. It has been the prior practice to blend certain compounds with the polymer to stabilize it against the degradative effects of heat and light. The properties and characteristics required of an additive if it is to be a successful light stabilizer are manifold. It must be colorless, odorless, and non-volatile. Any color in the compound will impart an objectionable initial color in the stabilized composition which will prevent the production of commercially merchandisable white articles. Likewise, any odor in the stabilizer will be transferred to the composition. When volatile stabilizers are employed, the stabilizers volatilize out of the composition leaving it in time unprotected against heat and light. In addition, the stabilizers must be compatible with the polymer and the other additives, such as pigments, which are commonly blended into polymer compositions. Compounds vary in their ability to absorb light and it is impossible to predict the effectiveness of any particular compound with any degree of certainty. Likewise, some of the compounds lose their effectiveness for absorbing light over prolonged periods of time.

In view of the above problems it would be desirable and it is the principal object to provide light stable compositions containing haloethylene polymers.

The above and related objects are accomplished by means of compositions comprising haloethylene polymers and stabilizing quantities of esters having the general formula:

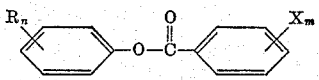

wherein R is alkyl and X is selected from the group consisting of hydrogen, halogen, and alkyl, and $m$ and $n$ are whole numbers of at least one.

The esters may be easily prepared from readily available reactants. A satisfactory preparation is described in U.S. 2,665,301 to Monroe et al. In that procedure the desired phenol is dissolved in aqueous caustic. The proper benzoyl chloride is added portionwise to the phenolate at a temperature of from 0° to 30° C. The reaction product is washed with water and filtered, after which it is recrystallized from ethanol. By a proper choice of suitably substituted phenols and benzoyl chlorides any of the esters falling within the scope of the above general formula may be prepared.

The compounds may be employed in amounts of from 1 to 10 percent based on the weight of the polymer, although it is preferred to use from 2 to 5 percent. The optimum amount to be used may be easily determined by simple preliminary experiment.

The esters of this invention show unusual effectiveness in stabilizing haloethylene polymers to the degradative effects of light. In addition, the esters are insoluble in caustic so that fibers, filaments, and similar articles prepared from these compositions may be caustic washed without leaching out the ester and thus destroying the light stability of the article. A still further advantage of the esters is that they are white. Most of the prior light stabilizers employed with haloethylene polymers have been yellow, so that the production of white articles was impossible and the production of articles in pastel shades was very difficult. The compositions of this invention lend themselves very well to the production of white and pastel articles.

The polymers which may be employed in the light stable compositions of this invention are those containing any halogen. As typical examples may be mentioned the polymers and copolymers of vinylidene chloride and the polymers and copolymers of vinyl chloride. It is preferred to use those polymers composed predominantly of vinylidene chloride since those polymers are known to be especially sensitive to light.

The compositions may contain the other common additives which are incorporated into polymer formulations. Thus, heat stabilizers, pigments, fillers and lubricants may be added to the compositions without affecting the light stability of the compositions. Other light stabilizers such as salol may be used in conjunction with the esters of this invention.

The advantages of the compositions of this invention will be apparent from the following illustrative examples wherein all parts are by weight.

EXAMPLE 1

A series of samples was prepared from a basic formulation consisting of 87.3 parts of a polymer prepared from 85 percent vinylidene chloride and 15 percent vinyl chloride together with 7 parts of a tetraester of pentaerythritol as plasticizer, 0.5 part of sodium tripolyphosphate as a heat stabilizer, 0.5 part of disodium lauryl phosphate as a second heat stabilizer, 0.5 part of titanium dioxide, and 0.2 part of citric acid. One of the samples was left as a blank. To the other samples was added 4 parts of a light stabilizer. Each of the samples was then compression molded to form moldings 0.1 inch in thickness. The moldings were placed under RS sunlamps for 14 days. After 1, 7 and 14 days they were examined visually for signs of degradation and rated according to an arbitrary numerical scale wherein 1 is white and 20 is black. The results are listed in Table I.

Table I

| Stabilizer | Rating after days | | |
|---|---|---|---|
| | 1 | 7 | 14 |
| None | 10 | 14 | 17 |
| 4-isopropylphenyl benzoate | 8 | 10 | 12 |
| 4-t-butylphenyl benzoate | 8 | 10 | 11 |
| 4-t-octylphenyl-4-chlorobenzoate | 7 | 10 | 11 |
| 4-t-butylphenyl-4-chlorobenzoate | 6 | 10 | 11 |
| 4-isopropylphenyl-3,4-dichlorobenzoate | 6 | 8 | 10 |

The results show that the compositions of this invention are resistant to the degradative effects of light.

EXAMPLE 2

A series of compositions similar to those of Example 1 was prepared except that tributyl aconitate replaced the tetraester of pentaerythritol as plasticizer and the heat stabilizer used was a sodium argano phosphate stabilizer sold under the name of Ferro 541A. Moldings were made and exposed to direct sun-light in the State of Arizona. The moldings were examined periodically and rated according to the scale described in Example 1. The results are listed in Table II.

Table II

| Stabilizer | Rating after exposure (ultraviolet sun hours) | | |
|---|---|---|---|
| | 125 | 250 | 375 |
| None | 6 | 14 | 18 |
| 4-t-butylphenyl-2,4-dichlorobenzoate | 5 | 7 | 11 |
| 4-t-butylphenyl-3,4-dichlorobenzoate | 5 | 7 | 11 |
| 4-isopropylphenyl-3,4-dichlorobenzoate | 8 | 10 | 13 |
| 4-t-octylphenyl-4-chlorobenzoate | 6 | 8 | 10 |
| 4-t-octylphenyl-2,4-dichlorobenzoate | 5 | 7 | 10 |
| 4-t-octylphenyl-3,4-dichlorobenzoate | 7 | 9 | 11 |
| 2,4-dimethylphenyl-2,4-dichlorobenzoate | 7 | 9 | 11 |
| 2,4-dimethylphenyl-3,4-dichlorobenzoate | 10 | 11 | 12 |
| 3,4-dimethylphenyl-3,4-dichlorobenzoate | 10 | 12 | 14 |
| 4-ethylphenyl-3,4-dichlorobenzoate | 7 | 9 | 11 |

After 375 ultraviolet sun hours the compositions of this invention show only slightly more than half the amount of degradation that is shown by a similar unstabilized composition.

EXAMPLE 3

Several compositions were prepared from the same basic formulation as that used in Example 1. One of the compositions was left as a blank. To each of the others was added 2 parts of a light stabilizer. The compositions were extruded as monofilaments which were then exposed to direct sunlight in the State of Arizona. Periodically the monofilaments were examined and rated according to an arbitrary scale wherein 1 indicates white and 12 indicates dark brown. The results are listed in Table III.

Table III

| Stabilizer | Rating after exposure (ultraviolet sun hours) | | |
|---|---|---|---|
| | 250 | 500 | 750 |
| None | 3 | 12 | 12+ |
| 2-chlorophenyl benzoate | 3 | 10 | 12+ |
| 4-chlorophenyl benzoate | 2 | 8 | 12+ |
| 2,4-dichlorophenyl benzoate | 1 | 10 | 12+ |
| 2,4,5-trichlorophenyl benzoate | 3 | 12 | 12+ |
| Phenyl-2-chlorobenzoate | 5 | 12 | 12+ |
| 2-chlorophenyl-2-chlorobenzoate | 2 | 10 | 12+ |
| 4-chlorophenyl-2-chlorobenzoate | 2 | 6 | 12+ |
| Phenyl-4 chlorobenzoate | 3 | 9 | 12+ |
| 4-chlorophenyl-4-chlorobenzoate | 2 | 7 | 12+ |
| 4-chlorophenyl-2,4-dichlorobenzoate | 2 | 5 | 12+ |
| 4-chlorophenyl-3,4-dichlorobenzoate | 3 | 8 | 12+ |
| 4-t-butylphenyl-2-chlorobenzoate | 2 | 3 | 7 |
| 4-t-octylphenyl-2-chlorobenzoate | 2 | 2 | 3 |
| 4-t-butylphenyl-4-chlorobenzoate | 2 | 3 | 4 |
| 4-t-octylphenyl-4-chlorobenzoate | 2 | 3 | 4 |
| 4-t-octylphenyl-3,4-dichlorobenzoate | 2 | 3 | 7 |

The results show the esters of this invention to provide about twice as effective protection against the degradative effects of light as known light stabilizers.

I claim:

1. A light stable thermoplastic composition comprising a thermoplastic chloroethylene polymer and from 1 to 10 percent of the weight of said polymer of an ester having the general formula:

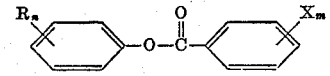

wherein R is a tertiary alkyl group containing from 4 to 8 carbon atoms, X is a halogen, $m$ is a number of from 1 to 2 and $n$ is a number of from 1 to 5.

2. The composition as claimed in claim 1 wherein the chloroethylene polymer is composed predominantly of vinylidene chloride with any remainder being of a monoethylenically unsaturated comonomer.

3. The composition as claimed in claim 1 wherein the ester is 4-t-butylphenyl-2,4-dichlorobenzoate.

4. The composition as claimed in claim 1 wherein the ester is 4-t-butylphenyl-3,4-dichlorobenzoate.

5. The composition as claimed in claim 1 wherein the ester is 4-t-octylphenyl-4-chlorobenzoate.

6. The composition as claimed in claim 1 wherein the ester is 4-t-octylphenyl-2,4-dichlorobenzoate.

7. The composition as claimed in claim 1 wherein the ester is 4-t-octylphenyl-3,4-dichlorobenzoate.

References Cited in the file of this patent

UNITED STATES PATENTS

| 2,157,068 | Carruthers et al. | May 2, 1939 |
| 2,464,250 | Moll et al. | Mar. 15, 1949 |
| 2,666,039 | Reid et al. | Jan. 12, 1954 |
| 2,789,957 | Pollock | Apr. 23, 1957 |